United States Patent
Tsuji

(10) Patent No.: US 7,169,084 B2
(45) Date of Patent: Jan. 30, 2007

(54) ELECTRONIC PEDOMETER

(75) Inventor: Tomoharu Tsuji, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 11/109,034

(22) Filed: Apr. 19, 2005

(65) Prior Publication Data

US 2005/0232388 A1   Oct. 20, 2005

(30) Foreign Application Priority Data

Apr. 20, 2004   (JP) .............................. 2004-124640

(51) Int. Cl.
*A63B 21/00* (2006.01)
*A63B 22/00* (2006.01)
(52) U.S. Cl. .................... 482/8; 482/1; 482/9; 702/160
(58) Field of Classification Search ................ 482/1–9, 482/74, 900–902; 702/127, 160; 600/483
See application file for complete search history.

(56) References Cited

U.S. PATENT DOCUMENTS

| | | | |
|---|---|---|---|
| 4,855,942 A * | 8/1989 | Bianco ........................ | 702/160 |
| 5,891,042 A * | 4/1999 | Sham et al. ................. | 600/483 |
| 6,254,513 B1 * | 7/2001 | Takenaka et al. .............. | 482/3 |

FOREIGN PATENT DOCUMENTS

| | | |
|---|---|---|
| JP | 56086309 | 7/1981 |
| JP | 63262784 | 10/1988 |
| JP | 2697911 | 9/1997 |
| JP | 3017529 | 12/1999 |

* cited by examiner

*Primary Examiner*—Glenn E. Richman
(74) *Attorney, Agent, or Firm*—Adams & Wilks

(57) ABSTRACT

To carry out step number measurement more precisely even when a walk signal enough to be detected is not obtained. After a fixed noise of a signal detected by an acceleration detecting portion having an acceleration sensor is removed by a filter portion of a counting portion, a walk cycle comparing portion compares a cycle of the resultant signal with a moving average value calculated by a walk cycle calculating portion, and each signal within a predetermined cycle range is counted as the number of steps for one step by a step number counting portion. A signal within a range similar to a cycle n times as large as a predetermined cycle of the signals each beyond the predetermined cycle range is judged as the number of steps for n steps by an extra-regulation step number processing portion and is counted as the number of steps for n steps by the step number counting portion. Data on the number of steps obtained through the counting in the step number counting portion is displayed on a display portion.

6 Claims, 4 Drawing Sheets

ELECTRONIC PEDOMETER

BACKGROUND OF THE INVENTION

1. Field of the Invention

The present invention relates to an electronic pedometer which is used by being mounted on a human body in order to electronically count the number of steps by a person having the electronic pedometer mounted thereon.

2. Description of the Prior Art

Heretofore, an electronic pedometer has been developed which is used by being mounted on a human body in order to count the number of steps by a user through an electronic processing.

In general, for counting of the number of steps, an acceleration caused by vertical movement of a user's body during walking is detected to count how many times the accelerations occur as the number of steps.

However, a problem arises in that various noises due to motions of daily life other than a walk are detected, and hence the number of steps cannot be precisely measured as has been pointed out formerly.

In order to solve this problem, there have been proposed a method in which as a filtering processing, after an acceleration is detected once, a predetermined dead zone time period is set to avoid misdetection due to noises (refer to Patent Document 1 for example), a method in which detection signals are counted as the number of steps only when it is detected that the detection signals are continuously outputted by the predetermined number of times (refer to Patent Document 2 and Patent Document 3 for example), a method in which a cycle of a walk is detected, and the number of steps is calculated from the cycle and a walk time period (refer to Patent Document 4 for example), and the like.

FIG. 3 is a block diagram of a pedometer described in Patent Document 1 described above. The pedometer includes: an acceleration detecting portion 301, which is used by being mounted on the body of a user, for detecting an acceleration caused by a walk of the user to output a signal (walk signal) corresponding to the walk; a filter portion 302 for outputting a signal having a predetermined cycle corresponding to a walk cycle from the output signal from the acceleration detecting portion 301; a walk cycle calculating portion 306 for calculating a walk cycle as a reference by averaging a predetermined number of signals of the signals outputted from the filter portion 302; a walk cycle comparing portion 303 for comparing a cycle of each signal outputted from the filter portion 302 with the walk cycle as the reference calculated in the walk cycle calculating portion 306 to output a signal having a cycle similar to the walk cycle as the above reference of the signals outputted from the filter portion 302; a step number counting portion 304 for counting signals from the walk cycle comparing portion 303; and a display portion 305 for displaying thereon a count value obtained through the counting in the step number counting portion 304. It should be noted that the filter portion 302, the walk cycle comparing portion 303, the step number counting portion 304, and the walk cycle calculating portion 306 can be configured with a central processing unit (CPU), and a storage portion for storing therein a program to be executed by the CPU.

The acceleration detecting portion 301 detects an acceleration caused by a walk of a walker to output a signal corresponding to the walk. The filter portion 302 outputs a signal having a predetermined cycle corresponding to a walk cycle from the output signal of the acceleration detecting portion 301. The walk cycle calculating portion 306 calculates a walk cycle as a reference by averaging a predetermined number of signals of the signals outputted from the filter portion 302. The walk cycle comparing portion 303 compares a cycle of each signal outputted from the filter portion 302 with the walk cycle as the reference calculated in the walk cycle calculating portion 306 to output a signal having a cycle similar to the walk cycle as the above reference of the signals outputted from the filter portion 302. The step number counting portion 304 counts signals from the walk cycle comparing portion 303 as signals corresponding to the walk. The display portion 305 displays thereon data on the number of steps as a count value obtained through the counting in the step number counting portion 304.

In such a manner, the electric pedometer is configured such that the walk cycle comparing portion 303 outputs the signals which are generated with a cycle similar to the walk cycle as the reference. Thus, a predetermined dead zone is provided so as not to detect any of the signals which are generated for time periods other than the time period similar to the time period having the walk cycle. As a result, it becomes possible to avoid that the noise is detected as the signal caused by the walk by mistake.

FIG. 4 is a signal waveform chart for explaining a signal detecting operation of the above conventional electronic pedometer, and shows an example of an electronic pedometer employing a system in which an acceleration sensor is mounted on an arm of a user in order to measure the number of steps by the user. In FIG. 4, an axis of abscissa represents time, and an axis of ordinate represents an acceleration detected by the acceleration detecting portion 301. Intersection positions (positions on a time base indicated by arrows) between the acceleration signal waveform and a reference level X represent a walk detected by the electronic pedometer. Since a cycle of the acceleration signal waveform is T, and the electronic pedometer employs the system in which the acceleration sensor is mounted on an arm of a user, two steps are detected per cycle T.

Actually, it is very difficult to detect only the acceleration caused by the vertical movement in a walk. The acceleration is influenced by operations other than a walk in daily life, and idle operations such as an operation of shaking arms in a walk. Thus, the detected acceleration signal is obtained as the sum of signals of those operations. For this reason, there is encountered a problem that a detection level fluctuates, and hence a walk signal which should be normally detected is not detected, but is omitted. That is, valley portions 401, 402 and 403 in FIG. 4 ought normally to drop below the reference level X to intersect the reference level X, whereby the intersection positions ought to be counted as the number of steps. However, there is encountered a problem that since the detection level fluctuates and omission is generated in the walk signal to be detected, the counting leakage occurs.

<Patent Document 1> JP 56-86309 A
<Patent Document 2> JP 63-262784 A
<Patent Document 3> JP 3,017,529 B
<Patent Document 4> JP 2,697,911 B It is an object of the present invention to carry out measurement of number of steps more precisely even when a sufficient detection signal for a walk cannot be obtained.

SUMMARY OF THE INVENTION

According to the present invention, there is provided an electronic pedometer having: walk detecting means, having a walk sensor, for outputting a walk signal corresponding to a walk of a user detected by the walk sensor; and counting means for counting the number of steps based on the walk signal from the walk detecting means, at least the walk sensor being used by being mounted on a body of the user, wherein the counting means counts each signal within a first reference cycle range of signals from the walk detecting means as one step, and counts as n steps a signal within a predetermined range, which takes a range n (positive integral number) times as large as a second reference cycle range as a reference, among signals each beyond the first cycle range.

The walk detecting means detects a walk of a user to output a walk signal corresponding to the walk. The counting means counts each signal within a first reference cycle range of signals from the walk detecting means as one step, and counts as n steps a signal within a predetermined range, which takes a range n (positive integral number) times as large as a second reference cycle range as a reference, among signals each beyond the first cycle range.

Here, the counting means may have: first cycle judging means for judging whether or not a signal from the walk detecting means is a signal within the first reference cycle range; second cycle judging means for judging whether or not a signal judged to be beyond the first reference cycle by the first cycle judging means among signals from the walk detecting means is a signal within a predetermined cycle range, which takes a range n times as large as the second reference cycle range as a reference; and step number counting means for counting each signal judged to be a signal within the first reference cycle range by the first reference cycle judging means of signals from the walk detecting means as one step, and for counting a signal judged to be a signal within a predetermined cycle range, which takes a range n times as large as the second reference cycle range as a reference, by the second reference cycle judging means as n steps.

In addition, the counting means has reference cycle calculating means for movement-averaging cycles of a predetermined number of signals from the walk detecting means. The cycle judging means may judge whether or not a signal from the walk detecting means is a signal within the first reference cycle range using as the first reference cycle range a predetermined range having as a reference the moving average calculated by the reference cycle calculating means.

In addition, the electronic pedometer further includes reference value storing means for storing therein data on the first reference cycle range. The cycle detecting means may judge whether or not a signal from the walk detecting means is a signal within the first reference cycle range using the first reference cycle range the data on which is stored in the reference value storing means.

In addition, the electronic pedometer may include manipulation means for storing the data on the first reference cycle range in the reference value storing means.

In addition, the electronic pedometer may be constructed so that the first reference cycle range and the second reference cycle range are identical to each other.

Also, the walk sensor may be used by being mounted on an arm of a user.

BRIEF DESCRIPTION OF THE SEVERAL VIEWS OF THE DRAWINGS

A preferred form of the present invention is illustrated in the accompanying drawings in which.

DETAILED DESCRIPTION OF THE PREFERRED EMBODIMENTS

An electronic pedometer according to an embodiment mode of the present invention will hereinafter be described with reference to the drawings.

Figure 1:
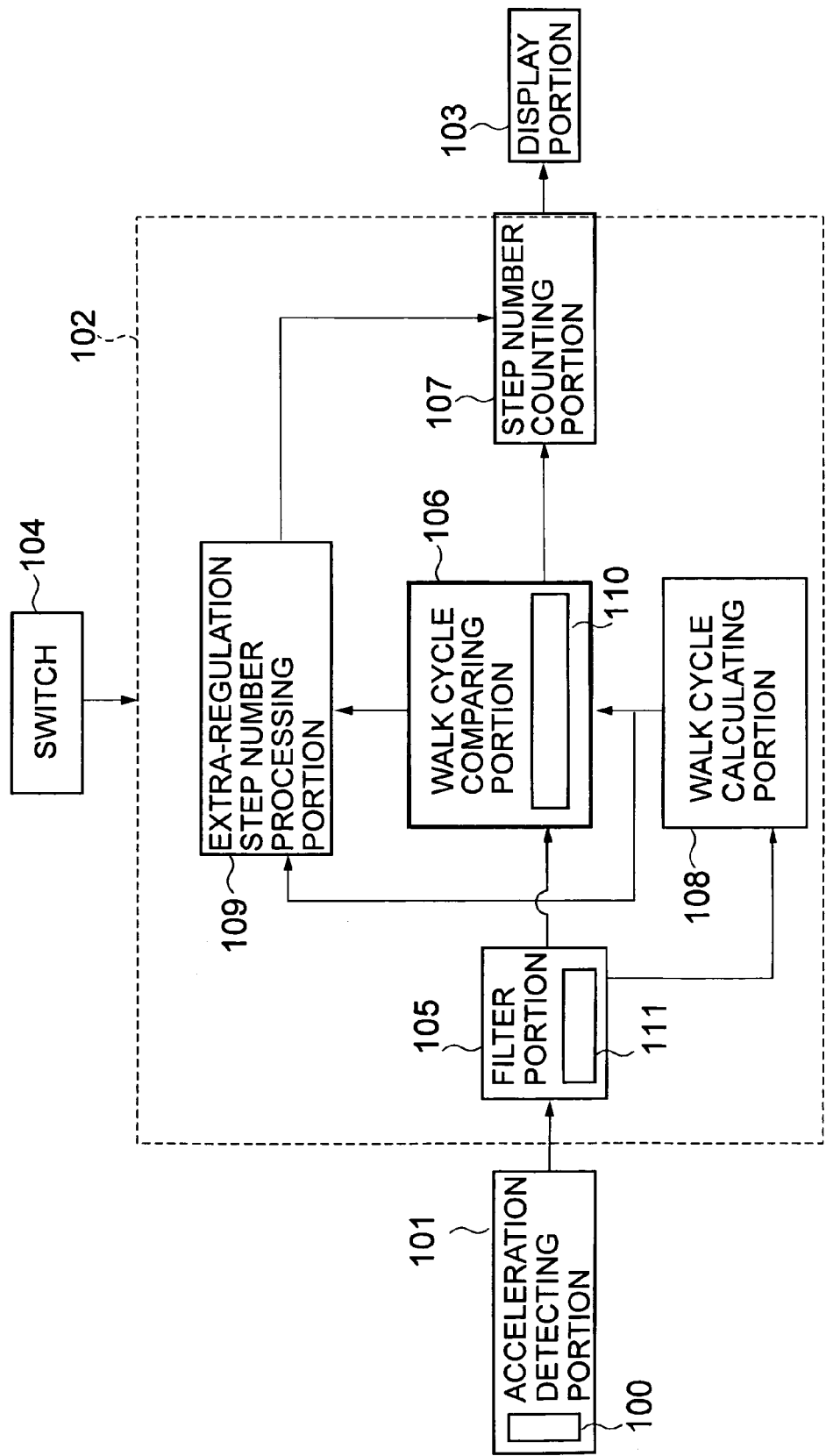
FIG. 1 is a block diagram of an electronic pedometer according to one embodiment of the present invention.

FIG. 1 is a block diagram of an electronic pedometer according to an embodiment mode of the present invention.

In FIG. 1, the electronic pedometer includes: an acceleration detecting portion 101 which has a walk sensor 100 constituted by an acceleration sensor and which serves to detect a walk (including running) of a user by the walk sensor 100 to output a signal (walk signal) corresponding to the walk; a counting portion 102 for counting the number of steps of the user based on the walk signal from the acceleration detecting portion 101; a display portion 103 which is constituted by a liquid crystal display device and which serves to display thereon data on the number of steps of the user counted by the counting portion 102; and a switch 104 as manipulation means for carrying out manipulations such as a counting start manipulation and a counting end manipulation for the counting portion 102, a manipulation for resetting the count value, and a manipulation for setting a reference cycle range.

The counting portion 102 may be constructed of a central processing unit (CPU) and a storage portion for storing therein a program to be executed by the CPU.

FIG. 1 shows a functional block diagram in which the counting portion 102 is functionally illustrated. The counting portion 102 includes: a filter portion 105 for outputting a signal having a predetermined cycle corresponding to a walk cycle of the output signals from the acceleration detecting portion 101; a walk cycle calculating portion 108 for calculating a reference walk cycle by obtaining a moving average Ta of cycles of a newest predetermined number of signals among the signals from the first filter portion 105; a walk cycle comparing portion 106 for comparing a cycle of each signal from the filter portion 105 with a first reference cycle range (Ta±10% in this embodiment mode) based on the reference walk cycle to output a signal within the first reference cycle range of the signals outputted from the filter portion 105 as the number of steps for one step to a step number counting portion 107 and to output a signal beyond the first reference cycle range of the signals outputted from the filter portion 105 to an extra-regulation step number processing portion 109; the extra-regulation step number processing portion 109 for comparing a cycle of the signal from the walk cycle comparing portion 106 with a second reference cycle range (nTa±10% (n is a positive integral number) in this embodiment mode) based on the reference walk cycle to output the signal within the second reference cycle range of the signals from the walk cycle comparing portion 106 as the number of steps as n steps to the step number counting portion 107 and to exclude the signal beyond the second reference cycle range as a noise; and a step number counting portion 107 for counting the number of steps by adding the numbers of steps obtained from the walk cycle comparing portion 106 and the extra-regulation step number processing portion 109 to the current number of steps.

When the walk cycle comparing portion 106 is configured to have a first reference storing portion 110 constituting reference cycle storing means together with a second reference cycle storing portion 111, and data on the first reference cycle range is set in the first reference cycle storing portion 110 in advance, the walk cycle calculating portion 108 can be omitted. In this case, the first reference cycle range is fixed to one value which is fixed in advance. In addition, the setting of the data on the first reference cycle range in the reference cycle storing portion 110 is carried out using the switch 104.

The filter portion 105 has a second reference cycle storing portion 111 constituting reference cycle storing means. Data on a fluctuation range (third reference cycle range) of a cycle when a user normally walks is stored in the second reference cycle storing portion 111 in advance. In this embodiment mode, the third reference cycle range is set in a range of 333 msec (180 rpm) to 1,000 msec. In addition, the setting of the data on the third reference cycle range in the second reference cycle storing portion 111 is carried out using the switch 104.

It should be noted that the acceleration detecting portion 101, the counting portion 102, the display portion 103, the switch 104, the walk cycle comparing portion 106, the step number counting portion 107, the work cycle calculating portion 108, and the extra-regulation step number processing portion 109 constitute walk detecting means, counting means, display means, manipulation means, first cycle judging means, step number counting means, reference cycle calculating means, and second cycle judging means, respectively.

Figure 2:
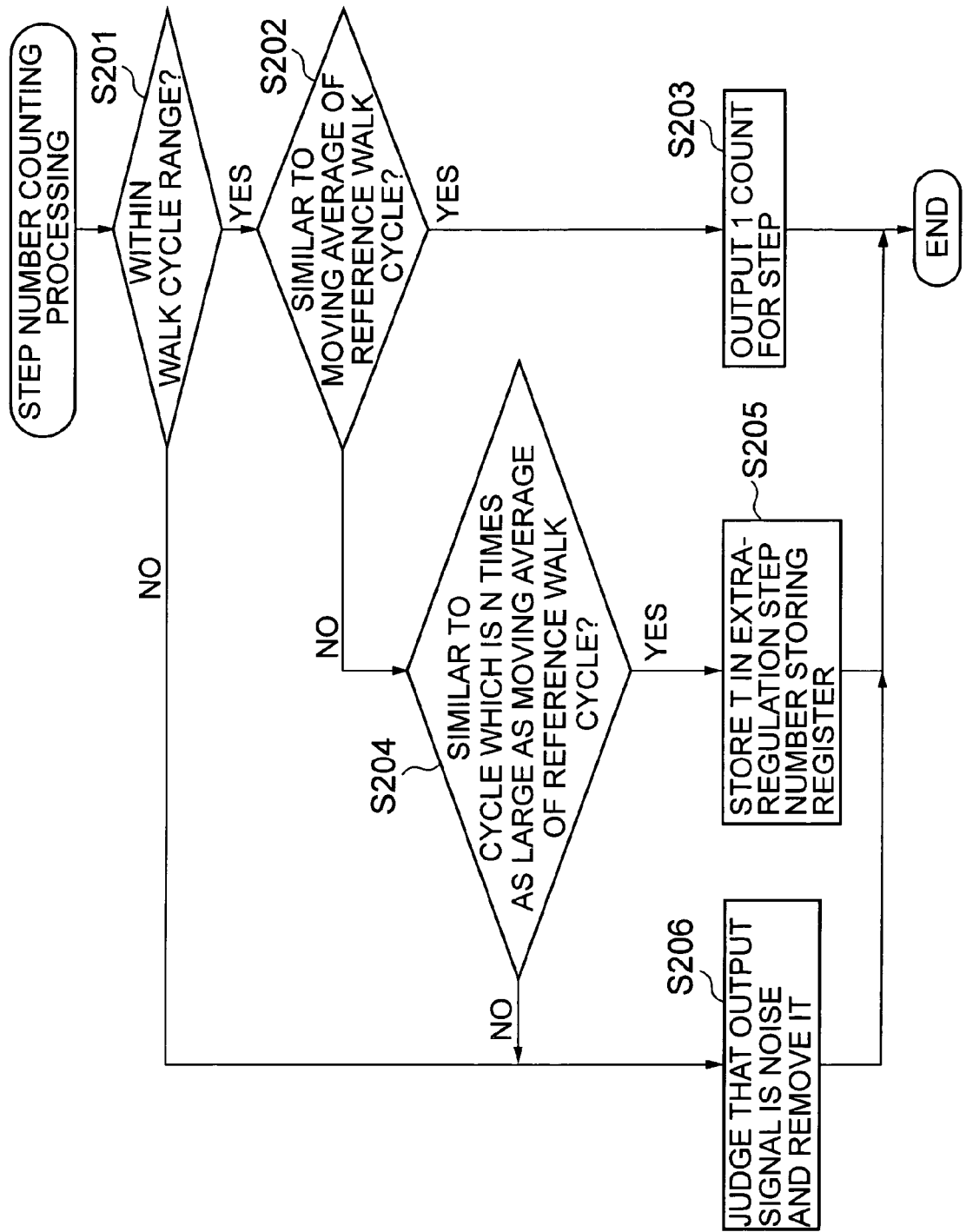
FIG. 2 is a flow chart for explaining processings in the embodiment of the present invention shown in FIG. 1.
Figure 3:
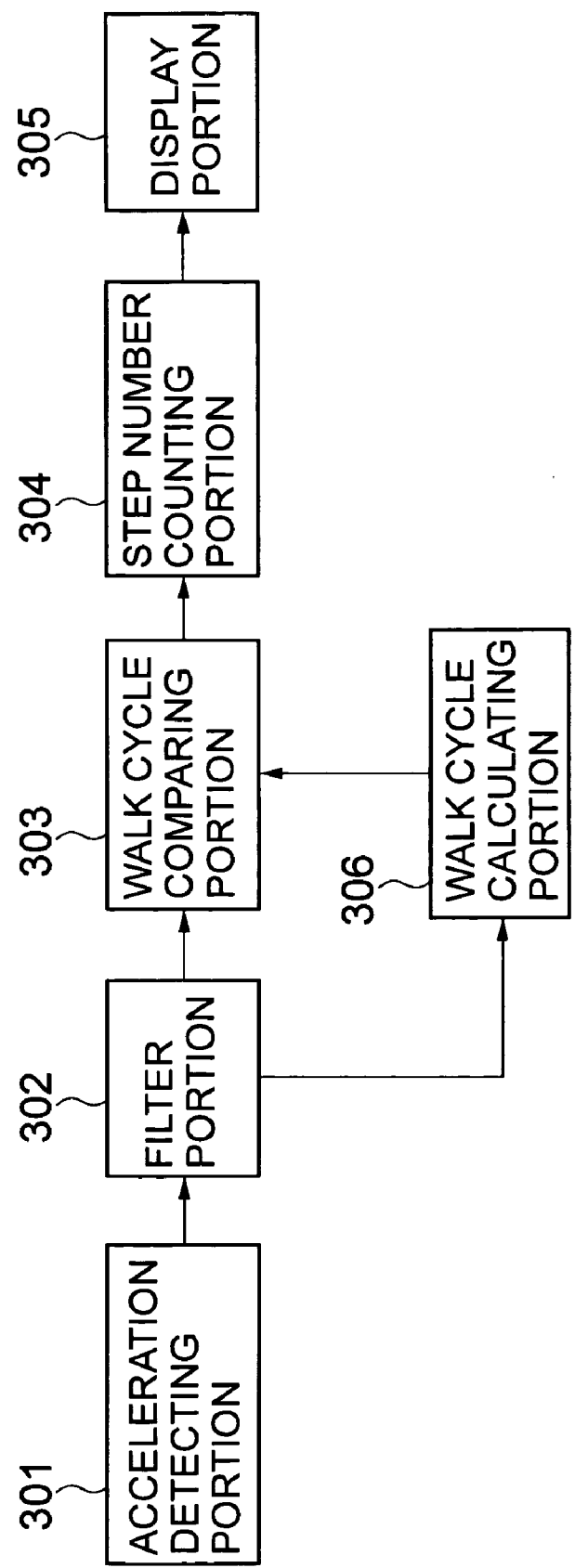
FIG. 3 is a block diagram of a conventional electronic pedometer.

FIG. 2 is a flow chart showing processings executed in the counting portion 102.

An operation of the electronic pedometer according to this embodiment mode will hereinafter be described with reference to FIGS. 1 and 2, and with reference to FIG. 4 as may be necessary.

First of all, a user wears the electronic pedometer on his/her body as preparation for measurement of the number of steps. At this time, the acceleration sensor provided in the acceleration detecting portion 101 is mounted on an arm of the user. In this state, the user causes the electronic pedometer to start an operation for measuring the number of steps by manipulating the switch 104, and starts to walk.

The acceleration detecting portion 101 detects a walk (including running) of the user to output a signal (walk signal) corresponding to the walk. The filter portion 105 judges whether or not a cycle T of the output signal from the acceleration detecting portion 101 is a value within a predetermined reference cycle range (the above third reference cycle range) for a walk (Step S201). That is, the filter portion 105 judges whether or not the cycle T of the output signal from the acceleration detecting portion 101 falls within the third reference cycle range the data on which is stored in the reference storing portion 111 in advance. In this embodiment mode, the filter portion 105 judges whether or not the cycle T of the output signal meets a condition of 333 msec (180 rpm)<T<1,000 msec.

When the filter portion 105 judges in Step S201 that the cycle T is beyond the third reference cycle range, the filter portion 105 judges that the output signal is a noise, and outputs no signal (Step S206). When the filter portion 105 judges in Step S201 that the cycle T falls within the third reference cycle range, the filter portion 105 judges that the signal from the acceleration detecting portion 101 is the walk signal, and outputs that signal.

Next, the walk cycle comparing portion 106 compares the cycle of the signal from the filter portion 105 with the first reference cycle range based on a reference walk cycle calculated by the walk cycle calculating portion 108, thereby judging whether or not the cycle of the signal from the filter portion 105 is similar to the reference walk cycle (Step S202).

Here, the judgment reference related to whether or not the cycle of the signal from the filter portion 105 is similar to the reference walk cycle means a reference with which the frequency of occurrence of a counting error due to noises is small and the walk signal can be counted with less leakage. In this embodiment mode, $Ta \pm 10\%$ (Ta is a moving average value of the cycles of a newest predetermined number of signals during a walk outputted from the filter portion 105) is set as the above first reference cycle range. Then, when the signal from the filter portion 105 is within the first reference cycle range, the walk cycle comparing portion 106 judges that the cycle of the signal from the filter portion 105 is similar to the reference walk cycle.

When the walk cycle comparing portion 106 judges in Step S202 that the signal from the filter portion 105 is within the first reference cycle range, the walk cycle comparing portion 106 judges that the signal from the filter 105 is the walk signal, and outputs the walk signal for one step to the step number counting portion 107. The step number counting portion 107 counts the walk signal from the walk cycle comparing portion 106 and adds 1 count to the step number count value until now to output the resultant value to the display portion 103 (Step S203). The count value which is obtained by adding 1 count to the count value displayed until now is displayed as an accumulated number of steps on the display portion 103.

On the other hand, when the walk cycle comparing portion 106 judges in Step S202 that the signal from the filter portion 105 is beyond the first reference cycle range, the walk cycle comparing portion 106 outputs the signal from the filter portion 105 to the extra-regulation step number processing portion 109.

The extra-regulation step number processing portion 109 compares the cycle of the signal from the filter portion 105 with a second reference cycle range based on the reference walk cycle calculated by the walk cycle calculating portion 108, thereby judging whether or not the cycle of the signal from the filter portion 105 is similar to the cycle which is n (n is a positive integral number) times as large as the reference walk cycle (Step S204).

Here, a judgment reference related to whether or not the cycle of the signal from the filter portion 105 is similar to the cycle which is n times as large as the reference walk cycle is a reference with which the frequency of occurrence of the counting error due to the noises is small and the walk signal can be counted with less leakage. In this embodiment mode, a value of $nTa$ (n times as large as the measurement average Ta)$\pm 10\%$ is set as the second reference cycle range. Thus, when the signal from the filter portion 105 is within the second reference cycle range, the extra-regulation step number processing portion 109 judges that the cycle of the signal from the filter portion 105 is similar to the cycle which is n times as large as the reference walk cycle.

When the extra-regulation step number processing portion 109 judges in Step S204 that the cycle of the signal from the filter portion 105 is similar to the cycle which is n times as large as the reference walk cycle, i.e., judges that the signal from the filter portion 105 is within the second reference cycle, the extra-regulation step number processing portion 109 judges that the signals from the filter portion 105 are n walk signals and outputs the walk signals for n steps to the step number counting portion 107. The step number counting portion 107 counts the walk signals for n steps from the extra-regulation step number processing portion 109 and adds n counts to the step number count value until now to output the resultant value to the display portion 103 (Step S205). The count value which is obtained by adding n counts to a count value displayed until now is displayed as an accumulated number of steps on the display portion 103.

When the extra-regulation step number processing portion 109 judges in Step S204 that the cycle of the signal from the filter portion 105 is not similar to the cycle which is n times as large as the reference walk cycle, i.e., judges that the signal from the filter portion 105 is beyond the second reference cycle, the extra-regulation step number processing portion 109 judges that the signal from the filter portion 105 is not a walk signal, but is a noise, and outputs no signal to the step number counting portion 107 (Step S206).

By repeating the above operation, the counting portion 102 executes the processing for counting the number of steps based on the walk signal detected by the acceleration detecting portion, and data on the accumulated number of steps is displayed on the display portion 103 at any time.

When the user intends to complete the step number measurement, the user can stop the counting operation in the counting portion 102 by manipulating the switch 104. In addition, the displayed contents on the display portion 103 can also be reset by manipulating the switch 104.

As described above, the electronic pedometer according to this embodiment mode having: the acceleration detecting portion 101 having the walk sensor for outputting a walk signal corresponding to a walk of a user detected by the walk sensor; and the counting portion 102 for counting the number of steps based on the walk signal from the acceleration detecting portion 101, the walk sensor being used at least by being mounted on the body such as an arm of the user is characterized in that the counting portion 102 counts each signal within a first reference cycle range of the signals from the acceleration detecting portion 101 as one step, and counts as n steps a signal within the predetermined range, which takes a range n (positive integral number) times as large as a second reference cycle range as a reference, among the signals each beyond the first cycle range.

Figure 4:
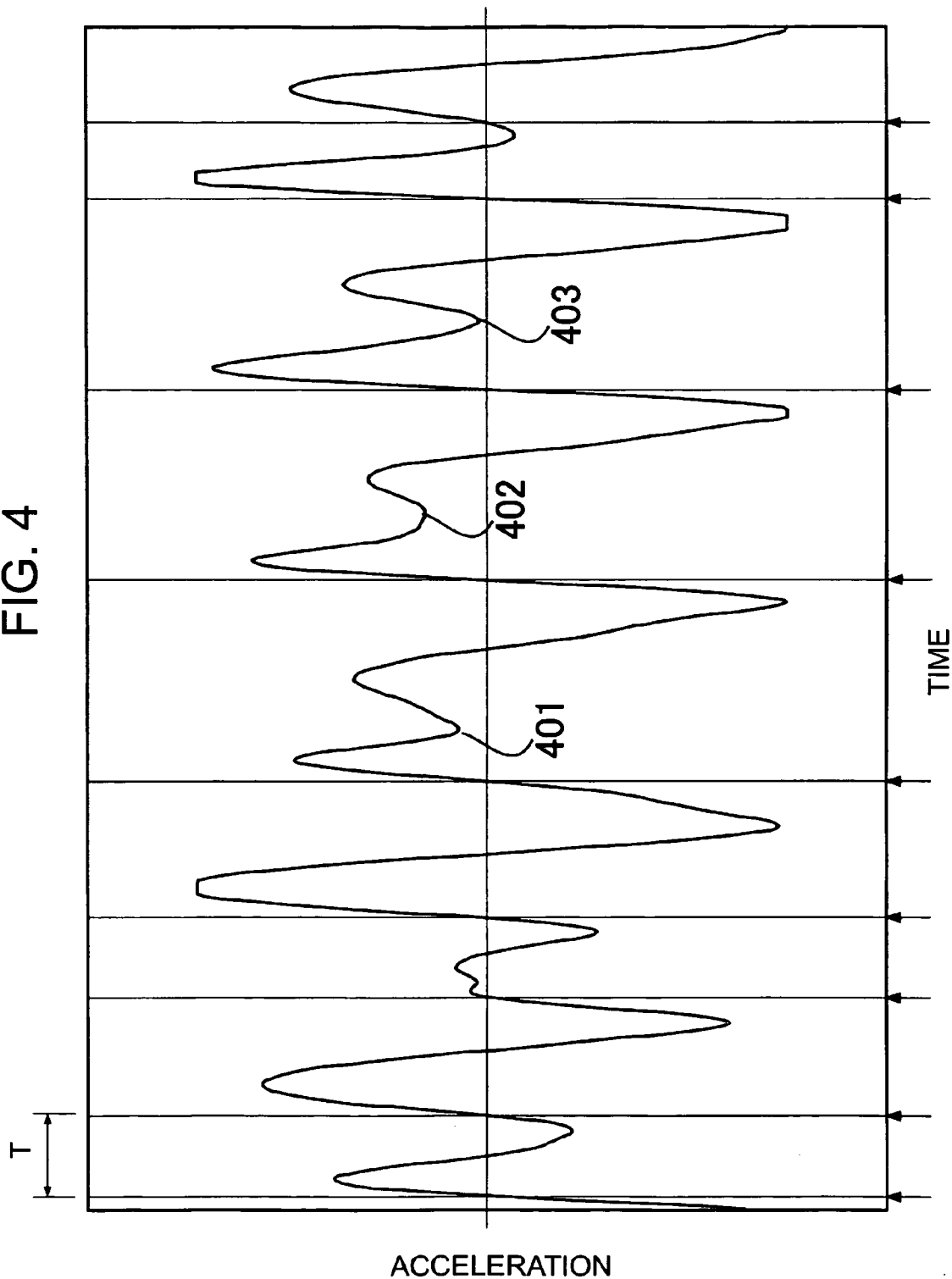
FIG. 4 is a signal waveform chart for explaining an operation of the conventional electronic pedometer.

Consequently, even when the walk signal enough to be detected can not be obtained as in the valley portions 401 to 403 of FIG. 4, so long as the signal from the acceleration detecting portion 101 is within the predetermined range (e.g., in the range of nTa±10%) with the cycle n times as large as the second reference cycle as the reference, even if any of the signals for a time period influenced by the disturbance or the like is not detected, the signal from the acceleration detecting portion 101 is counted as the number of steps for n steps. Thus, the step number measurement can be more precisely carried out.

Note that while in the above embodiment mode, the acceleration sensor is used as the walk sensor, a pressure sensor or the like provided in the sole of a shoe may also be used.

The present invention can also be applied to an electronic pedometer which is configured such that all constituent elements of the pedometer are mounted on a user in order to use the pedometer, or an electronic pedometer which is configured such that a part (including at least sensors) of constituent elements is mounted on a user, and other constituent elements transmit/receive signals in a wireless manner to/from the part of the constituent elements, and other constituent elements are provided in a place distant from the user. In addition, the present invention can also be applied to an electronic pedometer in which the walk sensor is mounted on a part of the body other than an arm.

According to the present invention, even when the sufficient detection signal for a walk cannot be obtained, measurement of the number of steps can be more precisely carried out.

What is claimed is:

1. An electronic pedometer comprising:
   walk detecting means having a walk sensor mountable on a user's body for outputting a walk signal corresponding to a walk of the user detected by the walk sensor; and
   counting means for counting the number of steps based on the walk signal from the walk detecting means by counting each signal within a first reference cycle range of signals from the walk detecting means as one step, and counting as n steps a signal within a predetermined range, which takes a range n (positive integral number) times as large as a second reference cycle range as a reference, among signals each beyond the first cycle range, the counting means comprising first cycle judging means for judging whether or not a signal from the walk detecting means is a signal wtihin the first reference cycle range, second cycle judging means for judging whether or not a signal judged to be beyond the first reference cycle by the first cycle judging means among signals from the walk detecting means is a signal within a predetermined cycle range, which takes a range n times as large as the second reference cycle range as a reference, and step number counting means for counting each signal judged to be a signal within the first reference cycle range by the first reference cycle judging means of signals from the walk detecting means as one step, and for counting as n steps a signal judged to be a signal within a predetermined cycle range, which takes a range n times as large as the second reference cycle range as a reference, by the second reference cycle judging means.

2. An electronic pedometer according to claim 1; wherein the counting means comprises reference cycle calculating means for movement-averaging cycles of a predetermined number of signals from the walk detecting means, and the first cycle judging means judges whether or not a signal from the walk detecting means is a signal within the first reference cycle range using as the first reference cycle range a predetermined range having as a reference the moving average calculated by the reference cycle calculating means.

3. An electronic pedometer according to claim 1; further comprising reference value storing means for storing therein data on the first reference cycle range, wherein the cycle detecting means judges whether or not a signal from the walk detecting means is a signal within the first reference cycle range using the first reference cycle range the data on which is stored in the reference value storing means.

4. An electronic pedometer according to claim 3; further comprising manipulation means for storing the data on the first reference cycle range in the reference value storing means.

5. An electronic pedometer according to claim 1; the first reference cycle range and the second reference cycle range are identical to each other.

6. An electronic pedometer according to claim 1; wherein the walk sensor is used by being mounted on an arm of the user.

* * * * *